(12) United States Patent
Currey et al.

(10) Patent No.: US 6,769,079 B1
(45) Date of Patent: Jul. 27, 2004

(54) SYSTEM AND METHOD FOR LOGGING MESSAGES IN AN EMBEDDED COMPUTER SYSTEM

(75) Inventors: Jonathan J. Currey, Lakeland, FL (US); Jorge E. Rodriquez, Apollo Beach, FL (US); Robert M. Jensen, Lakeland, FL (US); Kenneth R. Black, Lakeland, FL (US)

(73) Assignee: Borland Software Corporation, Scotts Valley, CA (US)

( * ) Notice: Subject to any disclaimer, the term of this patent is extended or adjusted under 35 U.S.C. 154(b) by 509 days.

(21) Appl. No.: 09/747,504

(22) Filed: Dec. 21, 2000

(51) Int. Cl.[7] .................................................. G06F 11/00
(52) U.S. Cl. .......................................... 714/45; 709/224
(58) Field of Search ............................. 714/45, 49, 57, 714/39, 37, 38, 26, 20, 18; 709/207, 206, 224, 237, 248

(56) References Cited

U.S. PATENT DOCUMENTS

| | | | | |
|---|---|---|---|---|
| 4,437,184 A | * | 3/1984 | Cork et al. | |
| 4,617,663 A | * | 10/1986 | Lake et al. | |
| 5,084,871 A | * | 1/1992 | Carn et al. | |
| 5,121,475 A | * | 6/1992 | Child et al. | |
| 5,950,014 A | * | 9/1999 | Hickerson et al. | |
| 5,983,292 A | * | 11/1999 | Nordstrom et al. | |
| 6,014,709 A | * | 1/2000 | Gulick et al. | |
| 6,230,198 B1 | * | 5/2001 | Dawson et al. | |
| 6,279,046 B1 | * | 8/2001 | Armstrong et al. | |
| 6,587,906 B2 | * | 7/2003 | Wolrich et al. | |

* cited by examiner

*Primary Examiner*—Nadeem Iqbal
(74) *Attorney, Agent, or Firm*—Darby & Darby

(57) ABSTRACT

A logging system which accepts logged messages concurrently from any number of parts of the application software. Each message is written to a message queue and then read and passed to a message forwarder, which the message forwarder analyzes one or more of the data fields of the message in order to decide whether to forward a particular message. In the event that the message will be forwarded, the forwarder also determines which destination or destinations to forward it to, which data fields from the logged message will be forwarded, and how those fields will be formatted when forwarded.

The forwarder code executes on its own Operating System thread or task to decouple the continued execution of the application from the process of forwarding the messages to their destination or destinations.

15 Claims, 14 Drawing Sheets

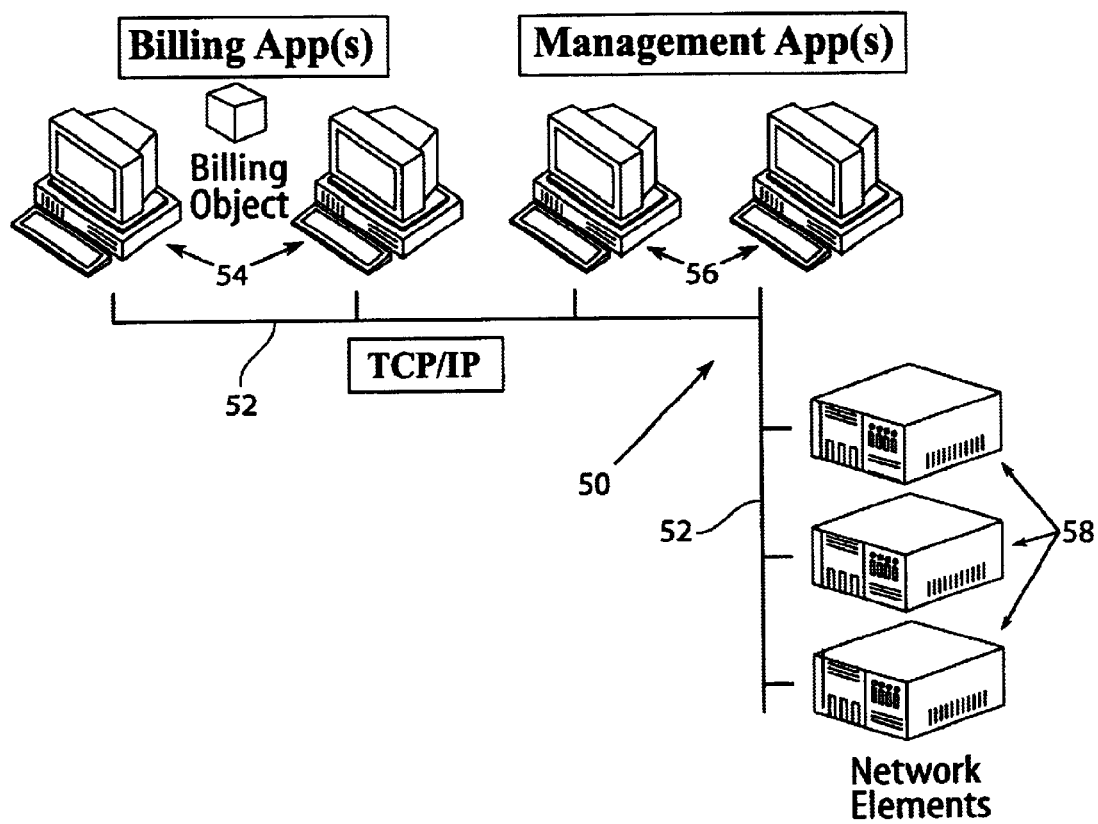

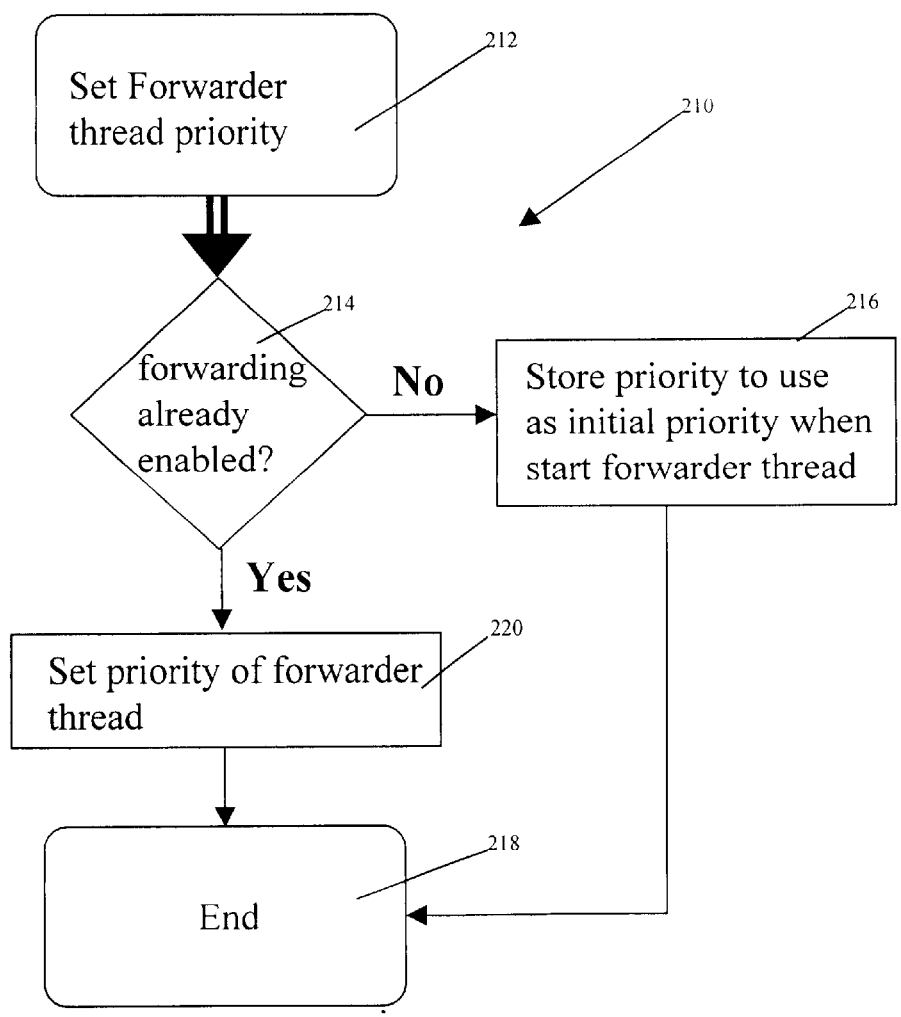

SYSTEM AND METHOD FOR LOGGING MESSAGES IN AN EMBEDDED COMPUTER SYSTEM

TECHNICAL FIELD

The present invention relates generally to the generation and utilization of logged messages in an embedded computer system, and more particularly relates to systems and methods for forwarding the logged messages within and outside of the embedded system, and controlling the priority of the logging activity within the embedded system.

BACKGROUND OF THE INVENTION

Computers have evolved from the traditional stand-alone type of computer to computer systems utilizing multiple computers distributed throughout a network. Some of these distributed computer systems are formed solely of traditional computers. Traditional computers typically have the following characteristics:

- being general purpose, rather than designed to perform one specific computational task;
- having their own, dedicated interface, usually with some interface for a human operator. Again, the interface is usually general purpose; and
- being physically distinct from machines intended for other, non-computational purposes, that they may interact with. However, other computer systems are formed solely or include as part(s) thereof, so-called "embedded" computers. An embedded computer is part of a larger machine and is specifically designed to operate with that machine. Embedded computer applications have unique requirements, typically including reduced power consumption and small physical size, to support portable or mobile use or installation in a confined space within the larger machine. Reduced heat dissipation is another common requirement, for either mobile or portable use or installation within a larger machine.

To meet these requirements, embedded computers generally use highly integrated processors, custom-designed hardware, and are scaled to minimize memory usage and provide high reliability.

Embedded computers also typically do not utilize a direct user interface, and therefore impose constraints on input and output of data. System events or error messages still need to be communicated from the embedded computer (or 'logged') to some destination where they can be acted upon, viewed or stored for later viewing. The destination may be another embedded or non-embedded computer within the overall system they are all a part of.

The capability to filter these logged messages is also required. That is, the capability to discard some of the messages (either at the source or at an intermediate or final destination), based on whether they record a type of event that is currently of interest. What kind of events are of interest may change, depending on the current state of the system or of the individual embedded computer that is producing the message. For example, whether the system or individual computer is being tested or used in full deployment, or has recently encountered a problem may affect which messages are of interest.

A current message logging system, provided by one Operating System for embedded computer systems, provides a logged message which includes a single piece of text data that is directed from the embedded computer via the Operating System's standard output mechanism for displaying text messages. This requires a device be available locally, to receive the output and display it. The logging is also performed without any filtering of the logged messages. The single piece of text data, in fact, does not distinguish any specific pieces of information or mandate that any particular information be contained within it which could be utilized for filtering (such as the importance of the message or its source).

Thus there is a need for a reliable and flexible logging of error and other system events which allows messages to be filtered and forwarded to different destinations as desired.

SUMMARY OF THE INVENTION

Stated generally, the present invention provides customizable and flexible handling of errors, warnings, and embedded computer system events as logged messages. The system accepts logged messages concurrently from any number of parts of the application software. (Any code, running on any number of Operating System threads or tasks.)

The messages are written into a message queue, from which each message is then read and passed to a "message forwarder." (Both the queue and forwarder reside locally on the embedded computer where the message was logged.) Rather than including only a single piece of text data, the messages are structured into multiple data fields, some of which are text strings and some of which are other data types, such as integers and time values.

The message forwarder analyzes one or more of the data fields of the message in order to decide whether to forward a particular message. In the event that the message will be forwarded, the forwarder also determines which destination or destinations to forward it to, which data fields from the logged message will be forwarded, and how those fields will be formatted (i.e., how their data will be presented) when forwarded. The forwarder even has the opportunity to transform the values of any of the data fields in the message, or to supplement them with additional data that is available to the forwarder.

The forwarder code that is executed may be specified by an application. This gives the application total control over which messages are filtered out (i.e. not forwarded), and for the messages that are forwarded, what data is forwarded and how it is formatted.

The forwarder code executes on its own Operating System thread or task, rather than the Operating System threads or tasks that the application code that logs the messages runs on. This decouples the continued execution of the application (after a call is made to log a message) from the process of forwarding the messages to their destination or destinations. The system provides a way to configure the priority of the Operating System thread or task that the forwarder executes on, and hence to control the priority of the logging activity relative to the other activities being performed on the same machine.

Other features and advantages of the present invention will become apparent from the specification, when taken in conjunction with the drawings and the attached claims.

BRIEF DESCRIPTION OF THE DRAWINGS

FIG. 3 is an illustration of a distributed computer system.

FIG. 12 is a flow diagram of the setting of the priority of the Operating System thread or task on which the message forwarding of the present invention occurs.

Detailed Description of the Disclosed Embodiments

Figure 1A:
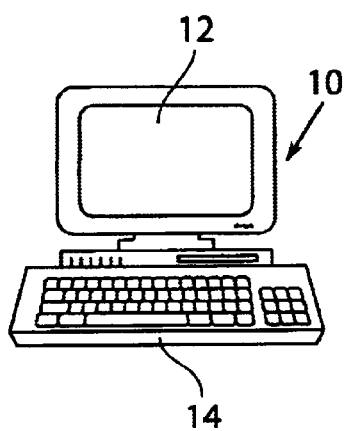
FIGS. 1A and 1B illustrate a traditional general-purpose computer system.
Figure 1B:
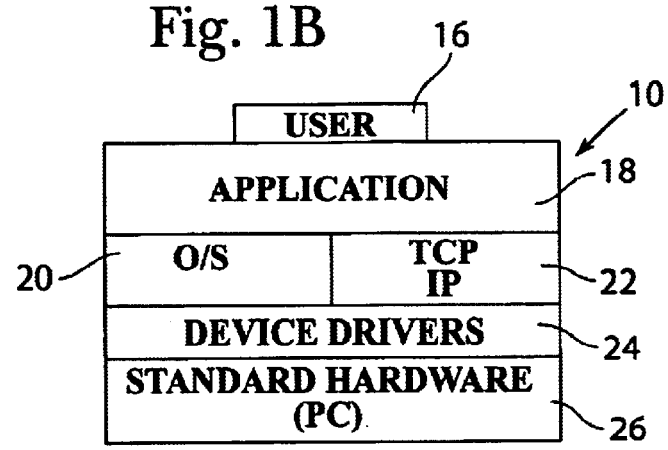

Referring now to the drawings, in which like numerals indicate like components and elements throughout the several drawing figures, FIGS. 1A and 1B illustrate a traditional general-purpose computer. The general-purpose computer is designated generally by the reference numeral 10. The hardware is typically standard personal computer (PC) hardware and typically includes a monitor 12 and a keyboard 14, with which a user (not illustrated) operates the standard computer 10 in a conventional manner.

The functional configuration of the computer 10 is illustrated in FIG. 1B, where a user is indicated as a block 16. The user 16 communicates as previously mentioned through the keyboard 14 with an application 18. As illustrated, the computer 10 can be considered a stack of software and hardware with the application 18 communicating directly with an operating system 20. The operating system 20, such as Windows or UNIX, includes the input/output (I/O) protocols 22, which can be any of a variety of protocols represented, for example purposes, by Transmission Control Protocol (TCP) which is one of the main protocols in the popular TCP/IP protocol family. The Internet Protocol (IP) deals only with packets, whereas the TCP enables two hosts to establish connection and exchange streams of data.

The protocol TCP guarantees delivery of data and also guarantees that packets will be delivered in the same order in which they are sent, allowing the computer 10 to be networked with other computers as will be described hereinafter. The operating system 20 also includes device drivers 24, which then operate with the standard PC hardware 26. A distributed application refers to a computer system that uses more than one computer 10 to run an application.

Figure 2A:
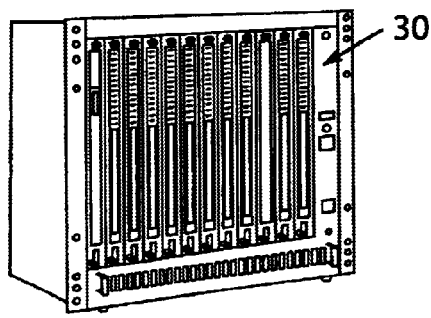
FIGS. 2A and 2B illustrate an embedded computer system that can include the present invention.
Figure 2B:
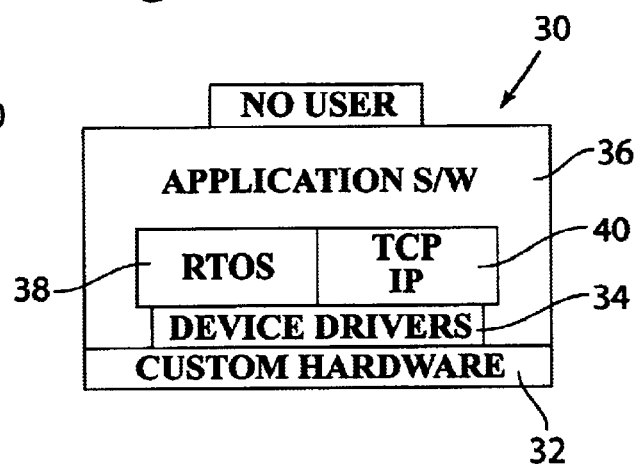

Referring to FIGS. 2A and 2B, an embedded computer system 30 is illustrated. The embedded computer system 30 is part of a larger system or machine, such as a telephone system, x-ray equipment, oil-well sensors, etc. The embedded computer typically does not utilize user interface I/O, and therefore does not include a screen and keyboard. Much of the hardware is custom hardware 32, which usually requires custom device driver software. Here the device drivers 34 are part of the application software 36. The operating system preferably is a real-time operating system (RTOS) 38. If the embedded computer is to interact with other computers in the system of which it is a part, one or more communication protocols 40 will be supported. TCP/IP 40 is the most popular network communication protocol, and is often present.

FIG. 3 illustrates one example of distributed computer system software forming a telecommunications system 50. The system 50 includes a network 52, which interconnects a plurality of computers. For example purposes, only a few of the computers are shown that forms the computer system 50 for the telephone network. The network 52 is shown as a single bus, but could be an aggregation of multiple networks, each possibly of a different type, and each possibly including multiple network segments, connected by network bridges, routers or switches, to produce one overall system network. The network 52 also could be connected to the external Internet. The network 52 can be coupled to a plurality of traditional computers, for example a pair of billing computers 54, and a pair of management application computers 56, for overall management of the system functions. The computers 54 and 56 typically would be in one or more telephone operators' management centers, and would use standard network communication protocols, such as TCP/IP.

The system 50 also includes a plurality of network elements 58, which communicate over the network 52 to the traditional computers 54 and 56, and serve to control the telephone and data network functions, such as switching for telephone calls and data traffic. The network elements 58 typically are implemented with several or many embedded computers inside each element. It is desirable for the network elements 58 to communicate errors, warnings, and system events to the management applications 56 and to one another, if desired. It would be desirable to provide a customizable handling of these events through a system logging mechanism.

Figure 4:
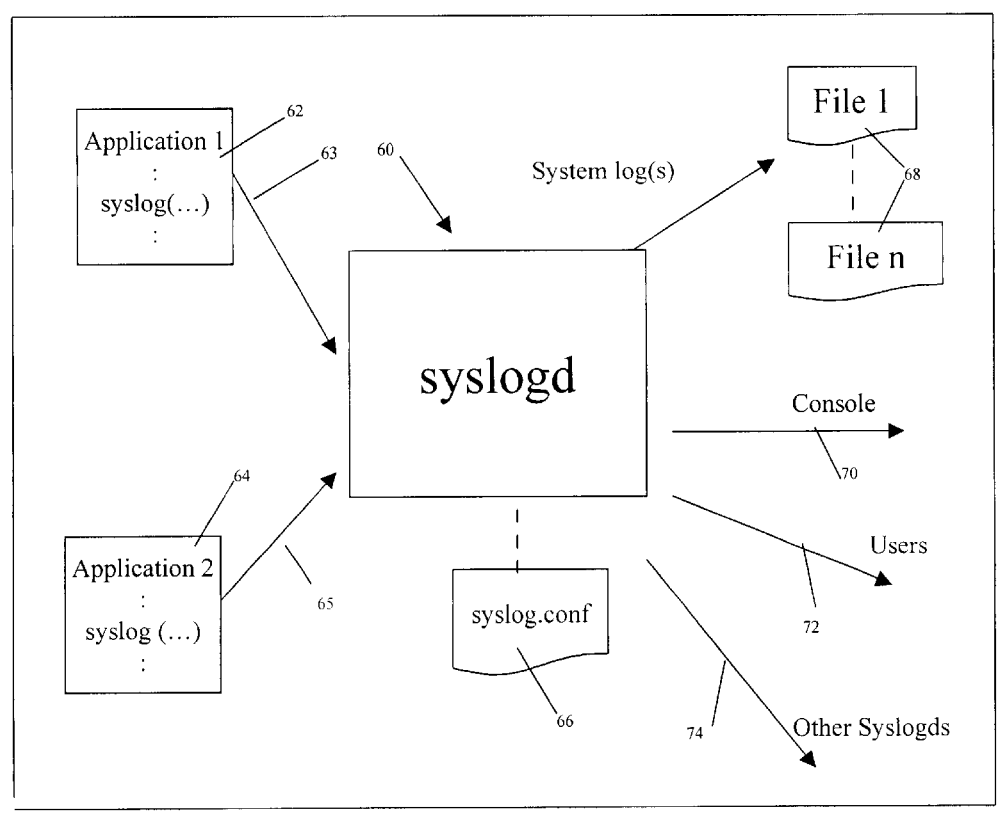
FIG. 4 is a diagrammatic illustration of a UNIX message logging system.

Referring to FIG. 4, a UNIX operating system logging system 60 entitled "Syslogd" is functionally illustrated. Syslogd 60 runs as a daemon process in the UNIX operating system, which performs a logging function in response to syslog( ) function calls that are made by the applications running in other processes on the same UNIX system. In this case, two application processes 62 and 64 are shown, each calling the syslog( ) function. This results in two messages 63 and 65 being logged to the daemon. The process calling syslog( ) includes a parameter indicating the priority or severity of the message being logged in the syslog( ) parameters, and the calling process also can utilize a bit mask to select log priority levels that are not sent to Syslogd 60. This represents a basic form of filtering, which is based on this one parameter alone and has to be configured in each calling application rather than being controlled in one centralized place. Syslogd 60 is coupled to a Syslog.conf file 66, which is a configuration file that can be used to specify that each logged message goes to any number of destinations, each of which is one of four types: an ordinary file in the file system 68; a system or administrator console 70; the terminal of a logged-in user or users 72; or to another Syslogd 74 running on another UNIX host machine in the same network.

The Syslog.conf file 66 allows filtering to determine which log messages go to which of the specified destinations 68, 70, 72 and 74, based on a limited type of source information associated with the process that calls syslog( ) (an integer 'facility id', which means what kind of source) and the priority (or 'severity') value given by that process as a parameter to the syslog( ) call.

The message logged by Syslogd 60 is a single string of data, which does not allow flexibility and ease in determining specific pieces of information. The syslog.conf method of routing logged messages to instances of four fixed types of destination does not allow flexibility in forwarding the log messages to user-defined locations in particular locations across a network, and non-UNIX destinations. Nor is the filtering based on a message priority/severity and type of source very flexible. The UNIX system is a standard, non-embedded application.

Figure 5:
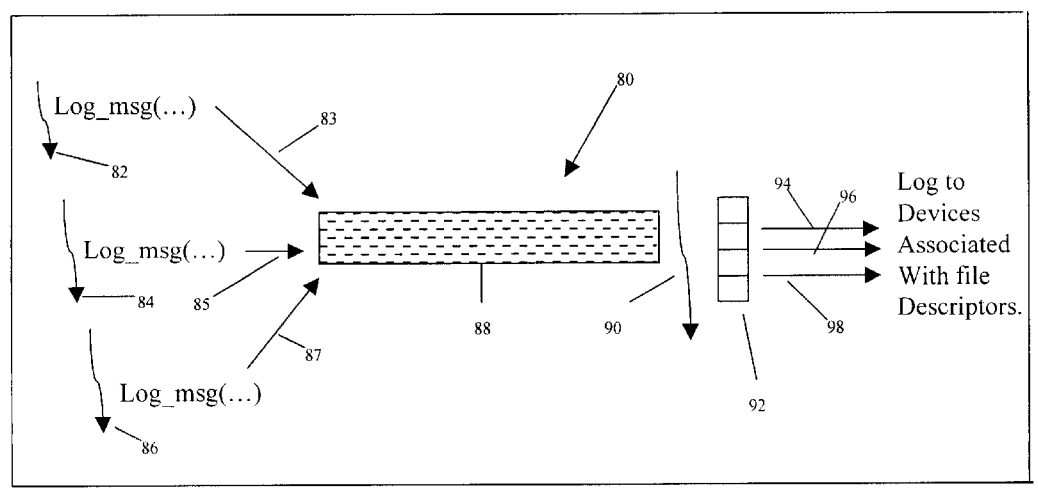
FIG. 5 is a diagrammatic illustration of an embedded real-time logging system.

A second type of logging system is illustrated in FIG. 5, which is provided as part of a VxWORKS embedded real-time operating system (RTOS) 80. The illustrated VxWORKS system 80 is shown as having a plurality of application tasks 82, 84 and 86, (VxWORKS tasks are comparable to threads). The application tasks 82, 84 and 86 are each shown as calling a Log_msg( ) function, which results in one message 83, 85, and 87 being logged by each task to the VxWORKS logging system. The log messages 83, 85 and 87 are written to a message queue 88. The logged messages are then read from the message queue 88 by another VxWORKS task, known as the logging task 90.

When the logging task 90 reads a message off the end of the message queue 88, the message is output to each file descriptor that is registered with the logging facility at that time. For example, a plurality of file descriptors 92 is illustrated as being registered. These file descriptors 92 could be associated with the standard output or standard error I/O stream 94, or an output to a file 96 if a file system is available to that VxWORKS machine (which is usually not the case). Any other device that has a device driver that supports the operating system file descriptor paradigm also may be coupled on a line 98. The file descriptors 92 can be added and removed as desired.

Although the file descriptors 92 can be added and deleted as desired, no filtering is provided either by the logging calls 82, 84 and 86, or by outputting the messages to the file descriptors 92. The log messages are each just a single piece of text data, handled first-in-first-out (FIFO) and are output to all file descriptors 92 that are active at the time each log message is read from the queue 88. The messages are not structured in any way to indicate information that could be used for filtering the messages or choosing which destination to send them to, such as priority or source. Nor is an opportunity available to examine the messages and decide which of the registered file descriptors to send or write them to.

Figure 6:
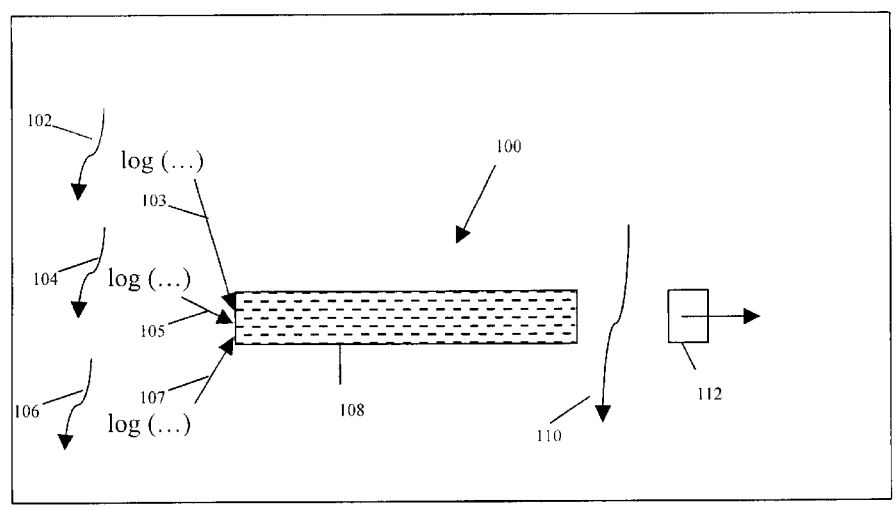
FIG. 6 is a diagrammatic illustration of the logging system of the present invention.

Referring now to FIG. 6, an embedded logging system 100 of the present invention is illustrated. The system 100 will be described as operating on a single machine running on any real-time operating system (RTOS), for example VxWORKS, PSOS, or OSE. Again, a plurality of threads or tasks 102, 104 and 106 running application code are shown. Each thread or task 102, 104 and 106 is shown as making a call to a log( ) function, that results in one message 103, 105, 107 being logged from each thread or task 102, 104 and 106 to the logging system 100. As with the VxWORKS logging system, the logged messages are written to a message queue 108 and are read in order from the message queue 108 by another thread or task, known in this case as a 'forwarder' 110.

The forwarder thread or task 110 differs from the log task in the VxWORKS logging system in that the code 112 that the thread or task executes ('forwarder code') may be provided by an application. Hence the forwarder 112 can be configured to operate upon the forwarded messages in a way that suits the applications.

The log( ) function that the application threads or tasks 102, 104 and 106 call to log a message has multiple parameters that correspond to multiple data fields within a log message data structure. These parameters are used to provide the values for the corresponding fields in a copy of the log message data structure that is created to represent each message that is logged. An example of one data structure is illustrated in the code describing FIG. 9. The forwarder code 112 considers the value of any of the fields of the logged message data structure in order to decide whether to forward (or filter out) a particular message. If the forwarder code 112 decides to forward the message, the value of any of the data fields may also be considered to determine which destination or destinations to send it to.

The forwarder code 112 has total control over which of the fields are sent and how they are formatted when they are sent. For example, multiple output formats or languages can be supported at the same time.

Furthermore, because the forwarder code 112 is responsible for implementing the mechanism by which the message is forwarded to each destination, the destinations to which messages may be forwarded are not restricted to those that can be represented by an Operating System file descriptor.

The different fields within the message data structure can specify information including the origin of the message (both which machine and which application or sub-system within an application the message originates from), a 'log level' (similar to that used in the UNIX syslog logging system), a time stamp (which can be assigned by the logging system at the time of the log call, before the message is put in the logger message queue 108), the line number and source code file of the log( ) call that caused the message to be logged and any other pieces of information as desired.

The separation into different data fields within a message data structure means that these values can be efficiently operated on independently by the forwarder code 112, to determine how to handle each message in an accurate and highly efficient manner.

The messages can be filtered or prioritized based on any or all of the data fields contained in the log message data structure, or even on external data which is available to the forwarder code 112 at the time the log message is read from the message queue 108.

By separating the log message forwarder 112 from the logger message queue 108, customization and flexibility of the handling of the log messages is provided by the present invention.

In an implementation in an object-oriented programming language, such as C++ or Java, the logging system 100 is represented as a 'Logger' object. An application thread or task must first obtain a reference to the Logger object before it can log messages to the logging system 100. In the simplest design, there need only be one Logger instance to represent the logging system 100. The process of obtaining a handle to the Logger instance 100 is illustrated by a flow chart 120 in FIG. 7. A call is made by the application to the logger system 100 as illustrated by a step or block 122, requesting a reference (or 'pointer') to the instance of the Logger object. The terms "block" and "step" are used interchangeably herein.

When the call is made, the query is then made in a block 124 on whether a Logger object already exists. If the Logger 100 is not yet in existence, the system will create a Logger instance 100 as illustrated by a block 126. The system then initializes a message queue 108 to form part of the implementation of the Logger object, as illustrated by a block 128. The logging system can utilize a message queue primitive to implement the message queue, if such a primitive is provided by the Operating System. (VxWORKS and some other real-time Operating Systems do provide such a primitive.)

Once the Logger instance 100 is fully initialized, the reference or pointer is returned to the calling application, as illustrated by a block 129. Once the Logger object instance 100 is initialized, each subsequent call to obtain a reference to the logger instance will result in a "yes" in the logger query 124, and the system will return the pointer or reference handle to the existing Logger object as illustrated by block 129. The above steps constitute an implementation of the 'singleton' object-oriented design pattern, by which a single instance of an object is obtained.

Figure 7:
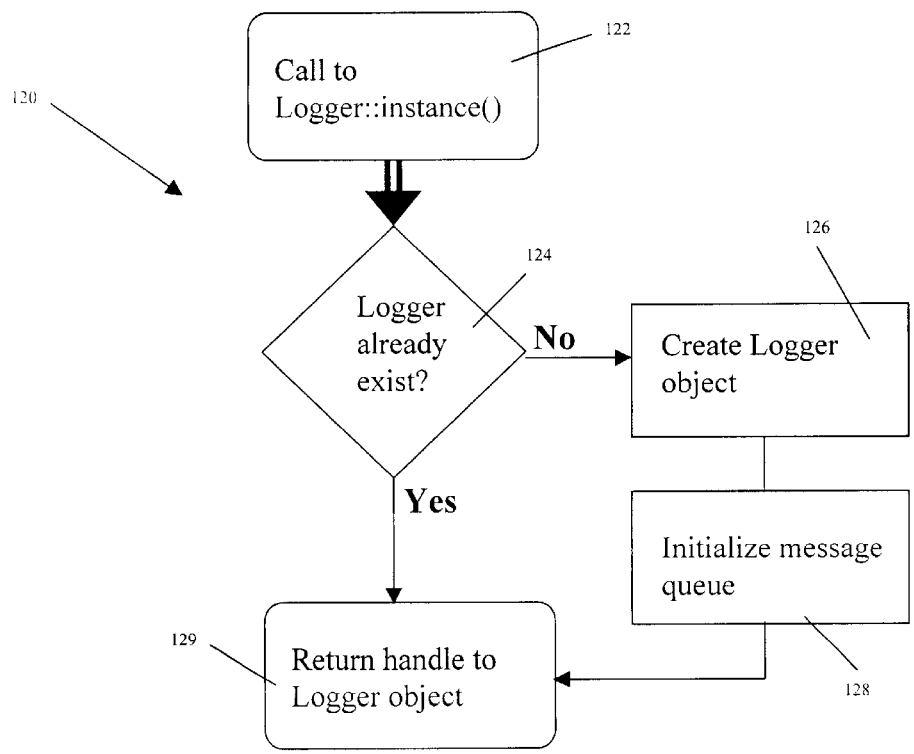
FIG. 7 is a flow diagram of obtaining a logger instance in the present invention.

A representative code (with annotations) of the operation of FIG. 7 follows.

Call to Logger::instance( )
==========================
(Pointer to a single ('singleton') instance of the Logger, which is initially null.)

singleton_instance_pointer:=NULL;

(The instance method of class Logger is a class-method that does not need to be called on a particular instance of the class. (In C++, a 'static' method.))

Logger::instance( )

Figure 8:
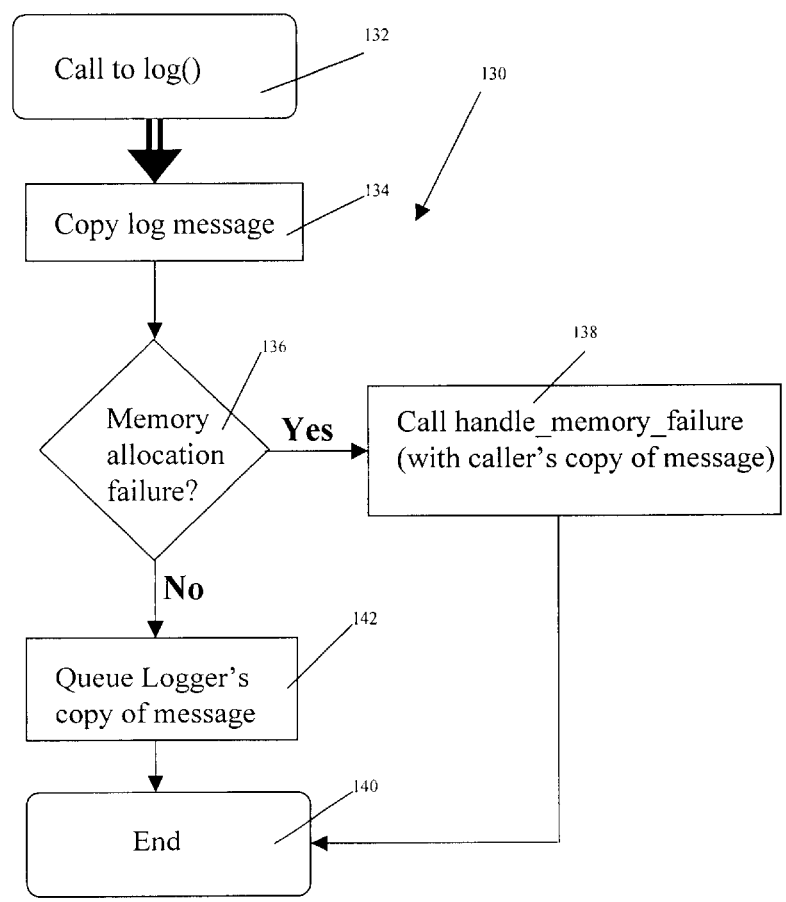
FIG. 8 is a simplified flow diagram of a log message queue of the present invention.

(First check to see if the single instance has already been created.)
    If singleton_instance_pointer==NULL
(If the instance does not exist, create it and store a pointer to it.)

singleton_instance_pointer:=pointer to new Logger instance (Then initialize the new Logger, which includes creating its message queue.)

singleton_instance_pointer.initialize( )
    endIf;

(Then return the pointer to the singleton Logger instance.)

return singleton_instance_pointer;
    end;

Once the logged object 100 is initialized, one of the application threads or tasks, for example 102, can make a call to the log( ) method of the Logger 100 as illustrated by a log message flow chart 130 illustrated in FIG. 8. The call is made as illustrated by block 132, and the parameters to the log( ) call are copied into a log message data structure.

A reference to this message data structure is queued in the logger message queue 108, as illustrated by a block 134. Since the amount of memory available on the embedded machine is limited, a check must be performed to ensure that all the memory required to create the message data structure was available. This is indicated by block 136. If the memory allocation fails, then as illustrated by a block 138, a call is made to handle memory failure with a copy of the caller's message that ends the log message step, as shown by a block 140. If, as indicated by a block 142, the memory allocation was successful, then the creation of the log message data structure was successful, so a reference to this structure can be queued in the logger message queue 108 which effectively hands the message off from the calling thread or task 102. The calling thread or task then continues with the next step of its code, after the call to log( ).

Figure 9:
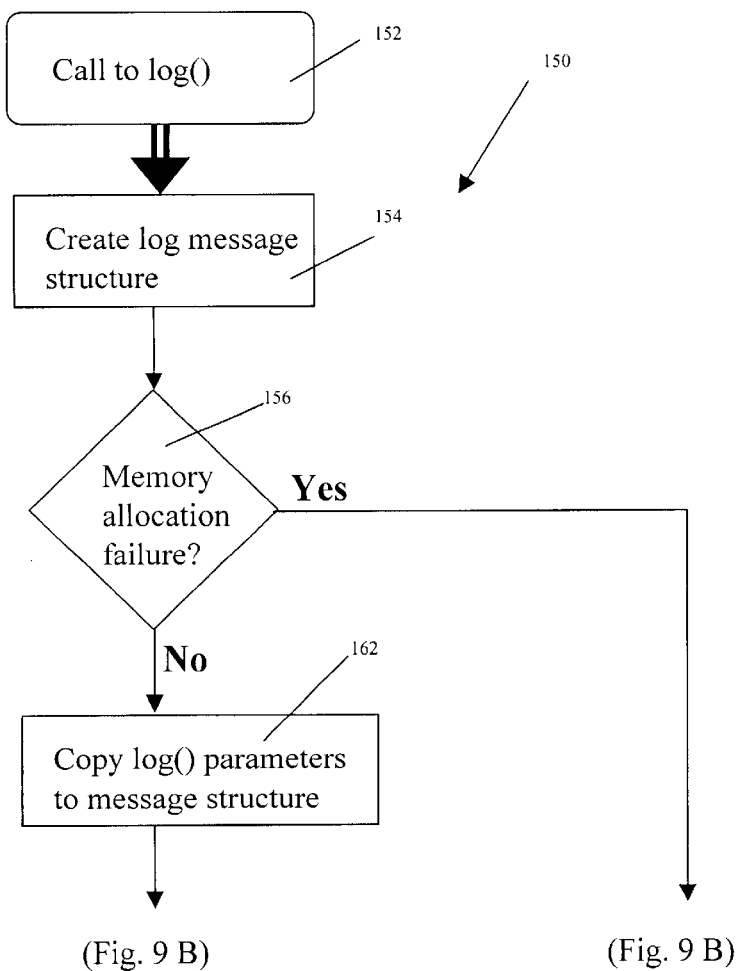
FIGS. 9A, 9B and 9C are detailed flow diagrams of the log message queue of the present invention.
Figure 9:
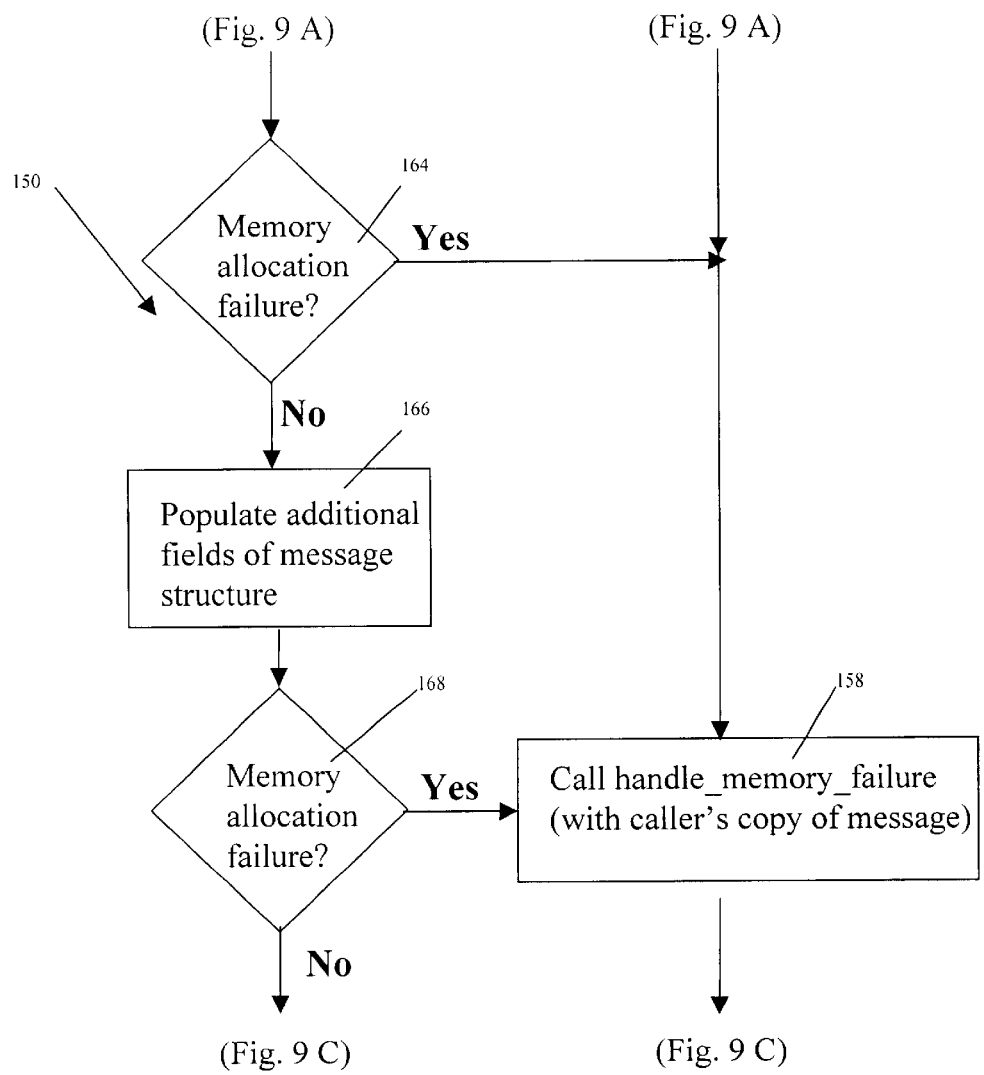
Figure 9:
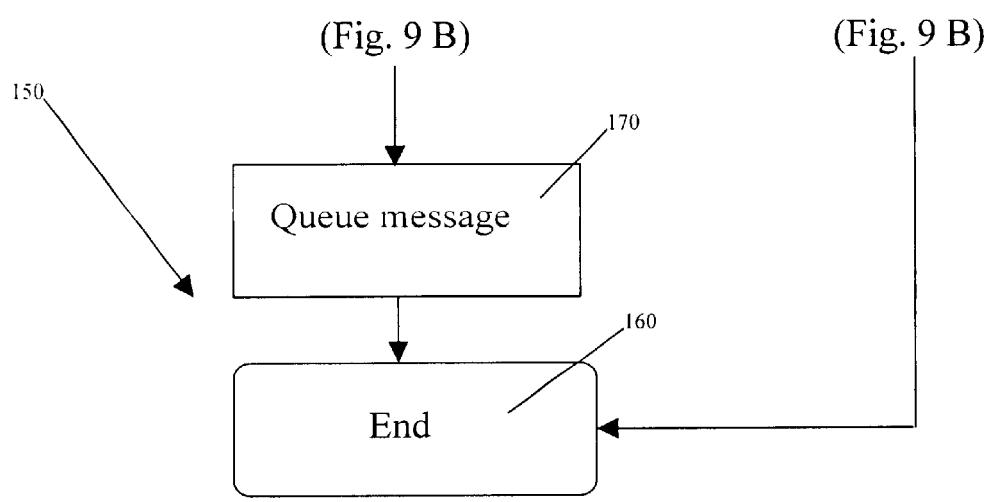

FIG. 8 in fact illustrates a simplified version of the message logging process of the present invention. A flow chart 150 in FIGS. 9A and 9C illustrates a more detailed flow chart of the message logging process of the present invention. The difference between FIG. 8 and FIG. 9. is that FIG. 9 shows more details of the process of copying the parameters to the log( ) call to create a log message data structure that can be queued in the logging message queue 108. The key point is that for data fields of a variable length type (such as strings of text), the field in the log message data structure will in fact hold a reference to another piece of memory, that contains the data for that field, rather than holding the data for that field directly. In this way, the log message data structure can be a fixed-size data type in the programming language, which takes up a known amount of memory (because memory references (pointers) take up a fixed amount of memory.) On the other hand, the length of the text string data fields is variable, so these are stored in independent pieces of memory, allocated according to the size of each string.

In the more detailed view of FIG. 9, again, there is a call to log step 152, which is followed by a creation (allocation of the memory for) the log message data structure 154. This data structure represents the log message, and it is a reference to this data structure that is stored in the message queue. (A reference to the log message data structure is stored in the message queue rather than the data structure itself, so that the data constituting the different fields of the message does not need to be copied in memory as the message is passed from the queue to the forwarder.)

The log message data structure contains data fields that will hold references to the data values of the different fields of the log message. These referenced data values have to be copies of the parameters passed into the log( ) call. The original pieces of data passed in as parameters to the call to log( ) cannot be referenced by the log message data structure because after the call to log( ) returns, the calling application is not required to retain those pieces of data that were passed as parameters. The logging system needs to be able to access the data at some later time, when the log message is forwarded by the forwarder code. Hence the logging system needs to make its own copy of the data in the parameters to log( ), to reference in the log message data structure.

A memory allocation failure query 156 is made after the allocation of the memory for the log message data structure itself, which is only part of the memory that needs to be allocated (because of the need to copy the data from the parameters). If the memory allocation fails, then as before, the "handle memory failure" method of the installed forwarder code is called, and is passed the uncopied parameters of the original caller's call to log( ). This call to "handle_memory_failure" is illustrated by a block 158, which will then end the logged message operation as indicated by an end block or step 160.

If the memory allocation is successful in block 156, then the step of copying the parameters to the log( ) call will take place as indicated by a block 162. As this requires more memory allocation, at step 162, these further memory allocations are then queried and, if it fails as indicated in a step 164, then the steps 158 and 160 will be followed as described before from the step 156. If the memory allocation succeeds, as illustrated by a block 164, any additional fields of the message structure that the logging system populates (such as a timestamp indicating when the message was logged, or a count indicating where this message comes in the sequence of messages logged via the logging system) can then be populated as illustrated by a step 166.

The next step is to insure that any memory required to store the values for these additional fields was successfully allocated. Again, if it fails, then the steps 158 and 160 will be accomplished; if it succeeds in the step, the message is then queued in the logger message queue 108 as shown by a step 170. This provides a very reliable message logging system that insures that the message is completely stored before being logged into the logger message queue 108. At each step, 156, 164, or 168, if the memory allocation fails, the partial memory that has been allocated or utilized is then freed up to maintain system efficiency.

A representative code (with annotations) of the operation of FIG. 9 follows.

Call to Logger::Log( )
====================
(Multiple pieces of data, that constitute fields of the message to be logged, are passed in as parameters to the Log method.)

Logger::Log(in message_field_1,
message_field_2,
message_field_3, . . .
message_field_n)
(Create a Log Message data structure.)

message_pointer:=pointer to a new Log Message structure instance (Check to see if a memory allocation failure occurred.)

If message_pointer is null (If a failure occurred, call handle_memory_failure on the installed Forwarder, passing it the passed-in parameters.)

installed_forwarder.handle_memory_failure(message_field_1,
message_field_2,
message_field_3,
message_field_n);
(Then return, without indicating failure to the caller (as the application has already had an opportunity to handle the failure in handle_memory_failure. This centralizes the failure case code, and makes using the logger more simple in application code.))

return;
endIf;

(Copy the passed-in parameters to the corresponding fields in the created log message data structure.)

message_pointer.field_1:=copy(message_field_1);
message_pointer.field_2:=copy(message_field_2);
message_pointer.field_3:=copy(message_field_3);
message_pointer.field_n:=copy(message_field_n);

(Again, if a memory allocation failure occurred when copying any of the parameters, call handle_memory_failure on the installed forwarder, passing it the passed-in parameters.)

If not message_pointer.field_1 or not
message_pointer.field_2 or not
message_pointer.field_3 or not
message_pointer.field_n
installed_forwarder.handle_memory_failure(message_field_1,
message_field_2,
message_field_3,
message_field_n);

(And return, without indicating failure to the caller.)

return;
endIf;

(Populate any additional (logger-assigned) fields of the message data structure.)

message_pointer.timestamp=get_current_time( );
message_pointer.message_id=message_count;
message_count:=message_count+1;
(If there was a memory allocation failure, when populating any of the additional, logger-assigned fields of the message data structure, call handle_memory_failure.)

If not message_pointer.timestamp or not
message_pointer.message_id
installed_forwarder.handle_memory_failure(message_field_1,
message_field_2,
message_field_3,
message_field_n);

(And return, without indicating failure to the caller.)

return;
endIf;

(Having fully initialized the log message, queue it to the Logger's message queue and return. (Only the pointer to the log message is queued, so that the data comprising it does not have to be moved in memory.))

message_queue.queue(message_pointer);
end;

At any time after the logging system has been initialized (by obtaining a reference to the Logger object), the step of enabling the forwarding task 110 may be undertaken. The steps of this process are illustrated by a flow chart 180 in FIG. 10. A first step 182 is a call to enable forwarding and, if the forwarding thread 110 is already enabled as illustrated by a block 184, then the enabled forwarding is completed as illustrated by a block 186. If the forwarder thread 10 has not been created yet, then as illustrated by a block 188, the forwarder thread 110 is created to forward the logged messages from the logger message queue 108. The forwarding task 110 is not enabled from the outset to allow logging of messages to be started before all the output mechanisms/destinations that the forwarder 112 will send messages to have been fully initialized.

Figure 10:
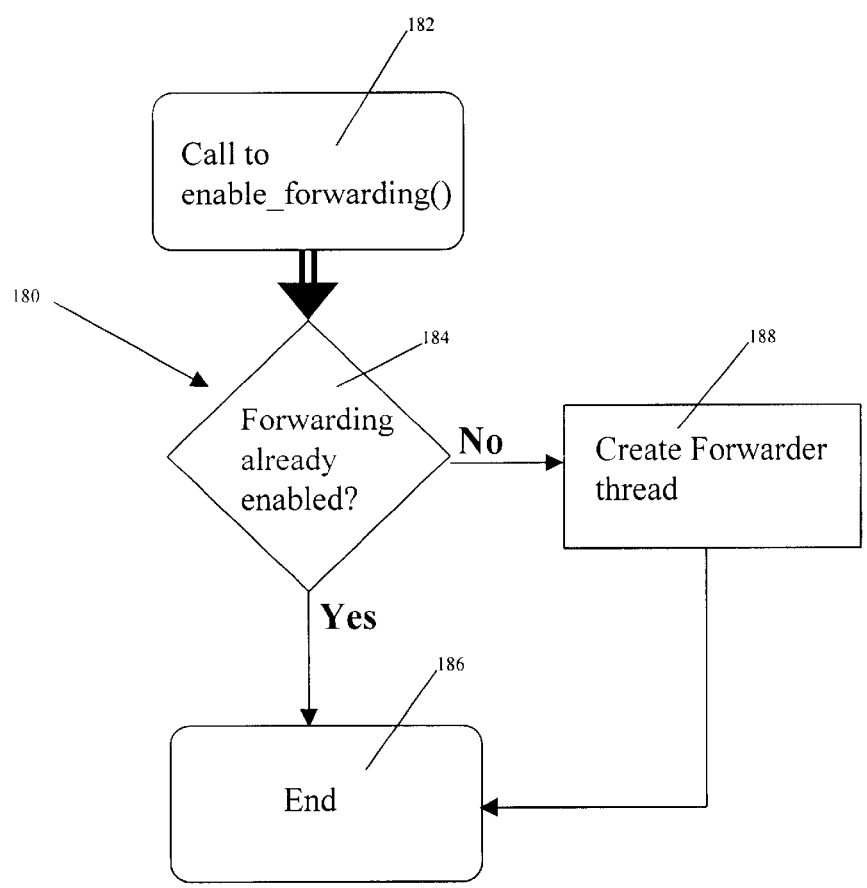
FIG. 10 is a flow diagram of the enabling of the message forwarding of the present invention.

A representative code (with annotations) of the operation of FIG. 10 follows.

Call to Logger::enable_forwarding( )
====================================
(Flag to indicate if forwarding is already enabled, which is initially false.)

```
forwarding_enabled:=false;
Logger::enable_forwarding( )
```

(If forwarding is already enabled, nothing to do so return immediately.)

```
If forwarding_enabled is true
return;
endIf;
```

(Otherwise, if not enabled, create the forwarder thread.)

```
create forwarder thread;
```

(Then set the forwarding enabled flag to true.)

```
forwarding_enabled:=true
end;
```

Figure 11:
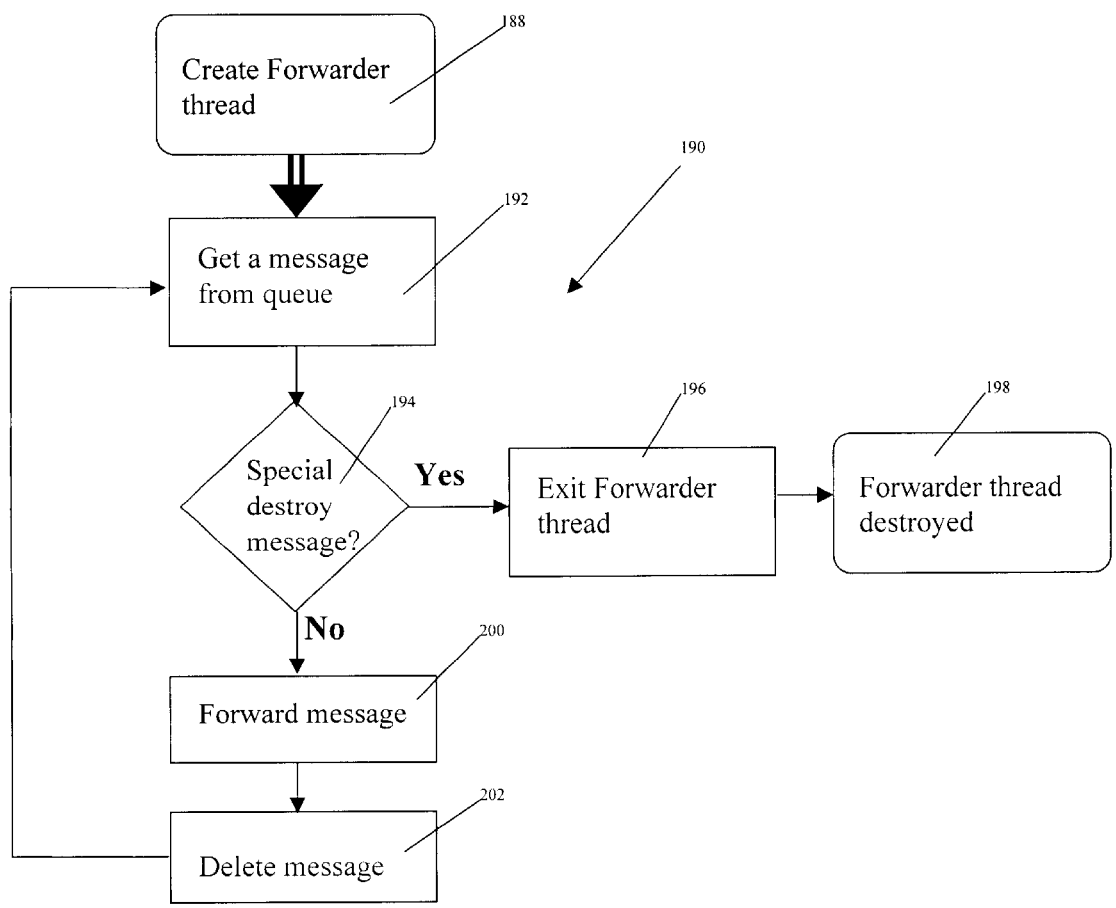
FIG. 11 is a flow diagram of the operation of the message forwarder of the present invention.

The operation of the forwarder thread 110 is illustrated by a flow chart 190 in FIG. 11. Once the forwarder thread 110 is created, again as illustrated by the step 188, the forwarder thread 110 will obtain a log message from the logger message queue 108 as illustrated by a step 192. The thread 110 can be stopped by a "destroy" message as shown by a step 194, either from the system or application code. If the "destroy" message exists, then the forwarder thread 110 will clean up the message it has obtained and then will stop between messages, exit the forwarder thread 110 as illustrated by a block 196, and destroy the forwarder thread 110 as illustrated by a block 198.

If, on the other hand, there is no "destroy" message, the logged message is passed to the installed forwarder code 112, by calling the forward_message method with the reference to log message data structure as a parameter. The forwarder code 112 can act on any of the separate data fields within the log message, to forward the message or not, depending upon the code residing in the forwarder 112. Once the log message forwarder 112 has forwarded the messages as indicated by a step 200, the message is deleted from the logger message queue 108 as illustrated by step 202. Once the message is deleted from the logger message queue 108, the next message is obtained as illustrated by the connection with step 192.

A representative code (with annotations) of the operation of FIG. 11 follows.

Forwarder Thread
================

(These are the steps that the Forwarder thread executes when it is created, after enable_forwarding( ) is called for the first time.)
Logger::forwarder_thread( )

(Repeat forever (only way out is if a destroy message is received).)

Repeat (Get a message from the Logger's message queue. (The call will block, waiting until a message is available. Only a pointer to the message is passed on the queue, so that the log message does not have to be moved in memory to pass it from the Logger to the forwarder thread.)

```
log_message_pointer=get_message_blocking
(message_queue);
```

(If the message is a special destroy message, return from this method, which will cause the forwarder thread to exit.)

```
If log_message_pointer points to a special destroy message
return;
endIf;
```

(Otherwise, call forward_message on the installed forwarder, passing it the message pointer (again, passing the pointer saves copying the log message data in memory again).)

```
installed_forwarder.forward_message(log_message_pointer);
```

(Then destroy the log message, by deallocating all associated memory.)

```
deallocate log_message_pointer.message_field_1;
deallocate log_message_pointer.message_field_2;
deallocate log_message_pointer.message_field_3;
deallocate log_message_pointer.message_field_n;
deallocate log_message pointer.timestamp;
deallocate log_message_pointer.message_id;
endRepeat;
end;
```

The priority of the forwarder thread/task 102, 104, 106 can also be set by calling the set_forwarder_priority( ) method in the API of the Logger object. The priority should be set to control the priority of the forwarding activity (i.e. the unbounded part of the logging activity) relative to the priority of the other activities on that embedded machine (and hence in the system as a whole, if control on all machines in the system.) Although the VxWORKS logging system employs a separate Operating System task for the logging activity, it does not offer an API for adjusting the priority of this task. Because the logging task is an operating system task, its priority can be controlled, but the application must find a way to identify the logging task among all the tasks executing on the system, in order to set its priority. No API is provided for doing this. Including the set_forwarder_priority( ) method in the programming interface of the current invention makes it easily possible to configure the priority of the forwarder thread, in a portable (Operating System independent) way.)

The operation of setting the priority is illustrated by a flow chart 210 in FIG. 12. In a first step 212, a priority is set for the forwarder thread or task 110. The next step 214 is to check to determine if the forwarder thread 210 has been enabled. If not, then a step 216 indicates that the priority will be saved until the forwarder thread 110 is enabled. The operation then is completed as shown by a block 218. If the forwarder thread 210 has been enabled, the next step from the step 214 is to set the priority of the thread 110 as shown by a block 220. The operation then ends as shown by the block 218.

Representative code (with annotations) of the operation of FIG. 12 follows.
Set_forwarder_priority (in thread_priority)

(Has the thread been created yet? (Created when forwarding is enabled).)

If not, forwarding has not been enabled.

(If not, just store the specified priority to use as the thread's initial priority when it is created).
forwarder_thread_starting_priority:=thread_priority;

return;
   endIf;

(If the thread has already been created, adjust the thread priority using whatever interface is provided by the Operating System.)

forwarder_thread priority(thread_priority);
   end;

The logging system 100 also can be integrated into middleware such as CORBA. Middleware is just another application from the point of view of the Operating System, but it forms part of the application development platform (along with the Operating System), from the point of view of the applications that use it. The logging system 100 allows the logging output from the middleware and from applications that use it to be integrated.

Although the present invention has been disclosed and described in terms of a preferred embodiment, it is not intended that the invention be limited to such embodiments. Modifications within the spirit of the invention will be apparent to those skilled in the art. The scope of the present invention is to be limited only by the claims, which follow.

What is claimed is:

1. A method for logging messages in an embedded computer system, comprising the steps of:

constructing a log message that includes a plurality of data fields, possibly of different data types, collected in a single log message data structure;

logging said log message in a logger queue;

forwarding said logged message from said queue to a log message forwarder, that executes on a separate operating system thread or task, and executes code that the application software may install; and determining whether to forward said log message to one or more destinations depending upon the results from said log message data field.

2. The method of claim 1, wherein the embedded computer system associates a priority with the log message forwarder and including the further step of controlling the priority of the log message forwarder relative to a priority of other activities in the embedded system.

3. The method of claim 1 further including performing said steps in an object-oriented programming language.

4. The method of claim 1, wherein said step of forwarding said log message includes determining which ones of said data fields in said log message will be forwarded.

5. A method for logging messages in an embedded computer system, comprising the steps of:

constructing a log message that includes a plurality of data fields of one or more different data types that are collected in a single log message data structure;

queuing the log message in a logger queue;

executing a log message forwarder on a separate operating system thread or task, the log message forwarder having a priority associated with it;

providing the log message from the logger queue to the log message forwarder;

determining one or more destinations for the log message by analyzing at least one of the plurality of data fields;

forwarding the log message to the one or more destinations using the log message forwarder; and controlling the priority associated with the log message forwarder relative to priorities of other threads or tasks in the embedded computer system.

6. The method of claim 5, wherein at least one of the destinations is a second embedded computer system.

7. The method of claim 5, wherein at least one of the destinations is a network management application computer for a telephone network.

8. The method of claim 5, wherein the controlling the priority step is performed by an application using a predefined application program interface method, the application program interface method being uniquely associated with the log message forwarder.

9. The method of claim 5, further comprising the step of modifying at least one of the data fields using the log message forwarder, the modifying step being performed before the forwarding step.

10. The method of claim 5, further comprising the step of removing at least one of the data fields using the log message forwarder, the removing step being performed before the forwarding step.

11. A method for logging a log message having at least one log value to one or more destinations, comprising the steps of:

performing a memory allocation query to determine whether there is enough free memory to successfully store the at least one log value within an embedded computer system;

creating a log message in memory;

copying the at least one value into the log message;

queuing a reference to the log message into a logger queue;

analyzing the log message to determine the one or more destinations for forwarding the log message; and forwarding at least part of the log message to the one or more destinations.

12. The method of claim 11, wherein the analyzing and forwarding steps are performed by a log message forwarder that executes on a separate operating system thread or task.

13. The method of claim 11, wherein the at least one log value comprises at least two log values of at least two distinct data types.

14. The method of claim 11, wherein the at least one log value is at least two log values and the step of forwarding at least part of the log message further comprises the steps of selecting at least one value to be forwarded from the at least two log values and forwarding the at least one value to be forwarded to the one or more destinations.

15. The method of claim 11, wherein the log message comprises plural data fields, and there is a log value in at least one of the data fields and wherein the forwarding step comprises forwarding the data field containing the log value.

* * * * *